United States Patent
Kim et al.

(10) Patent No.: US 8,699,466 B2
(45) Date of Patent: Apr. 15, 2014

(54) APPARATUS AND METHOD OF CONTROLLING SEAMLESS HANDOVER BETWEEN HETEROGENEOUS NETWORKS BASED ON IPV6 OVER IPV4 TUNNELING MECHANISM

(75) Inventors: Sun Cheul Kim, Daejeon (KR); Pyung Koo Park, Daejeon (KR); Seong Moon, Daejeon (KR); Young Soo Shin, Choongchungnam-do (KR); Ho Yong Ryu, Daejeon (KR); Sung Back Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 380 days.

(21) Appl. No.: 12/747,971

(22) PCT Filed: Oct. 17, 2008

(86) PCT No.: PCT/KR2008/006162
§ 371 (c)(1),
(2), (4) Date: Jun. 14, 2010

(87) PCT Pub. No.: WO2009/078573
PCT Pub. Date: Jun. 25, 2009

(65) Prior Publication Data
US 2012/0014350 A1    Jan. 19, 2012

(30) Foreign Application Priority Data
Dec. 14, 2007   (KR) .................. 10-2007-0131343

(51) Int. Cl.
*H04W 4/00* (2009.01)
(52) U.S. Cl.
USPC ........................................ 370/332

(58) Field of Classification Search
USPC .............................. 370/328–9, 331–2, 227–8
See application file for complete search history.

(56) References Cited

U.S. PATENT DOCUMENTS

| 6,850,503 B2 * | 2/2005 | Dorenbosch et al. ......... 370/331 |
| 2003/0074453 A1 * | 4/2003 | Ikonen ........................ 709/228 |

(Continued)

FOREIGN PATENT DOCUMENTS

| JP | 2005-244997 | 9/2005 |
| KR | 2002-0030821 | 4/2002 |

(Continued)

OTHER PUBLICATIONS

Hirokazu Naoe et al., "IPV6 Soft Handover Applied to Network Mobility Over Heterogeneous Access Networks", Personal, Indoor and Mobile Radio Communications, 2007. OIMRC 2007. IEEE 18 the international Symposium on Sep. 3-7, 2007, 5 pages.

(Continued)

*Primary Examiner* — Mark Rinehart
*Assistant Examiner* — Peter Cheng
(74) *Attorney, Agent, or Firm* — Staas & Halsey LLP

(57) ABSTRACT

The invention relates to a method and an apparatus for controlling seamless handover between heterogeneous networks based on IPv6 over IPv4 tunneling. When IPv6 service is provided using tunneling in an IPv4 based network environment, handover of a mobile terminal between different networks is achieved through switching of an active tunnel and a standby tunnel, and thus handover between different networks is facilitated and data loss is prevented to secure continuity of service provided to the mobile terminal even when the mobile terminal hands over to a heterogeneous network.

17 Claims, 8 Drawing Sheets

(56) References Cited

U.S. PATENT DOCUMENTS

| | | | |
|---|---|---|---|
| 2004/0111402 A1* | 6/2004 | Waters et al. | 707/3 |
| 2007/0086382 A1* | 4/2007 | Narayanan et al. | 370/331 |
| 2007/0155376 A1 | 7/2007 | Payyappilly et al. | |
| 2008/0240020 A1* | 10/2008 | Ye et al. | 370/328 |
| 2012/0195288 A1* | 8/2012 | Oh | 370/331 |
| 2012/0250516 A1* | 10/2012 | Aggarwal et al. | 370/238 |

FOREIGN PATENT DOCUMENTS

| | | |
|---|---|---|
| KR | 10-2006-0127571 | 12/2006 |
| KR | 10-2008-0050973 | 6/2008 |
| KR | 10-2009-0064285 | 6/2009 |
| WO | 2008/069504 A1 | 6/2008 |

OTHER PUBLICATIONS

Jivesh Govil et al., "IPv6: Mobility Management and Roaming between IPv6 and IPv4", Convergence Information Technology, 2007. International Conference on Nov. 21-23, 2007, pp. 1553-1558.

David Masso, "Mobile IPv6 Support for Dual Stack Mobile Nodes and Routers", University of Kalsruhe(TH), Institute for Algorithms and Cognitive Systems, Aug. 31, 2006.

International Search Report for PCT/KR2008/006162, mailed Jun. 3, 2009.

* cited by examiner

APPARATUS AND METHOD OF CONTROLLING SEAMLESS HANDOVER BETWEEN HETEROGENEOUS NETWORKS BASED ON IPV6 OVER IPV4 TUNNELING MECHANISM

CROSS REFERENCE TO RELATED APPLICATIONS

This application claims the benefit under 35 U.S.C. Section 371, of PCT International Application No. PCT/KR2008/006162, filed Oct. 17, 2008, which claimed priority to Korean Application No. 10-2007-0131343, filed Dec. 14, 2007, the disclosures of which are hereby incorporated by reference.

TECHNICAL FIELD

The present invention relates to an apparatus and a method of controlling seamless handover between heterogeneous networks based on IPv6 over IPv4 tunneling mechanism and, more particularly, to an apparatus and a method of controlling seamless handover between heterogeneous networks based on IPv6 over IPv4 tunneling mechanism for enabling service to be continuously used between different network when IPv6 service using a tunneling technique is provided in an IPv4 based network environment.

This work was supported by the IT R&D program of MIC/IITA. [2007-S-013-01, Project name: All IPv6 based Fixed-Mobile Convergence Networking Technology Development]

BACKGROUND ART

With the recent development of networks, a mobile terminal can be connected to a plurality of networks. In general, a mobile terminal performs handover between different networks in such a manner that the mobile terminal confirms whether the mobile terminal can be connected to a network to which the mobile terminal will hand over and then receives information on neighbouring connection nodes between the different networks to implement the handover of the mobile terminal.

However, even if handover can be performed between different networks as described above, most current services are based on IPv4 and do not support IPv6 in many cases and it is difficult to support IPv6 service in IPv4 based service. A mobile terminal cannot use real-time service while moving because the existing IPv4 based mobility technology is not currently used in an actual IPv4 network. Furthermore, it is difficult to secure mobility of a mobile terminal when IP versions are different, that is, between IPv4 based service and IPv6 based service, and thus mobility should be secured in the event of handover between different networks.

Accordingly, it is required to develop technology as interim technology of IPv4 and IPv6 as the current IPv4 based communication service is evolved into IPv6 based service.

Moreover, mobility supporting technology for real-time services such as VoD and VoIP is based on IPv4, and thus the technology cannot be used in IPv6 because mobility cannot be supported. Since these real-time services are currently provided while mobility is ignored, there is a problem in the service effectiveness thereof. Therefore, development of technology capable of supporting mobility for real-time services is needed.

DISCLOSURE OF INVENTION

Technical Problem

An object of the present invention is to provide an apparatus and a method of controlling seamless handover between heterogeneous networks based on IPv6 over IPv4 tunneling mechanism for providing IPv6 service while minimizing change of the existing network equipment using IPv6-over-IPv4 tunneling and enabling handover while guaranteeing service continuity between different networks such that IPv6 service can be provided in real time.

Solution to Problem

To accomplish the object of the present invention, there is provided an operating method of a mobile terminal for handover, comprising the steps of detecting a radio signal, connecting with a first network and requesting a control server to set a first tunnel for transmitting data packets, detecting a radio signal of a second network different from the first network and requesting the control server to set a second tunnel corresponding to a standby tunnel while maintaining the first tunnel established in response to the request as an active tunnel, and requesting the control server to switch the second tunnel to an active tunnel when a radio signal of the second tunnel is stabler than a radio signal of the first tunnel to perform handover to the second network.

A handover control method according to the present invention comprises the steps of establishing a first tunnel corresponding to an active tunnel for a first network for a mobile terminal when a first tunnel establishment request is received from the mobile terminal, establishing a second tunnel corresponding to a standby tunnel for a second network for the mobile terminal when a second tunnel establishment request is received from the mobile terminal, and switching the second tunnel to an active tunnel and switching the first tunnel to a standby tunnel to hand over the mobile terminal to the second network when a request for switching the second tunnel to an active tunnel is received from the mobile terminal.

A mobile terminal according to the present invention comprises an interface management module for selecting one of radio signals with respect to a plurality of networks, setting an active interface or a standby interface, managing interfaces, and monitoring and managing signal quality, a tunneling protocol module for requesting a control server to set a tunnel using the interface selected by the interface management module, and a tunneling driver module for establishing a tunnel according to a response of the control server and generating and managing a tunnel management table.

A control server according to the present invention comprises a tunneling driver module for establishing a first tunnel corresponding to an active tunnel and a second tunnel corresponding to a standby tunnel for a mobile terminal at the request of the mobile terminal and allocating tunnel IDs to the first tunnel and the second tunnel and a server tunneling protocol module for controlling transmission of data packets through the first and second tunnels, transmitting/receiving control messages to/from the mobile terminal and switching the second tunnel to an active tunnel at the request of the mobile terminal such that a service that has been provided through the first tunnel is provided through the second tunnel.

Advantageous Effects of Invention

The apparatus and method of controlling seamless handover between heterogeneous networks based on IPv6 over IPv4 tunneling mechanism according to the present invention can achieve handover that guarantees service continuity of provided IPv6 service only by developing or modifying a server and terminal software without changing network equipment through tunnel switching using an active tunnel and a standby tunnel to thereby provide efficient IPv6 based service at a low cost.

Furthermore, tunneling is used for real-time services such as current IPv4 network based VoD or VoIP service that does not support mobility to secure mobility based on IPv6 and provide real-time services without having data loss.

BEST MODE FOR CARRYING OUT THE INVENTION

Embodiments of the present invention will be explained with reference to attached drawings.

Figure 1:
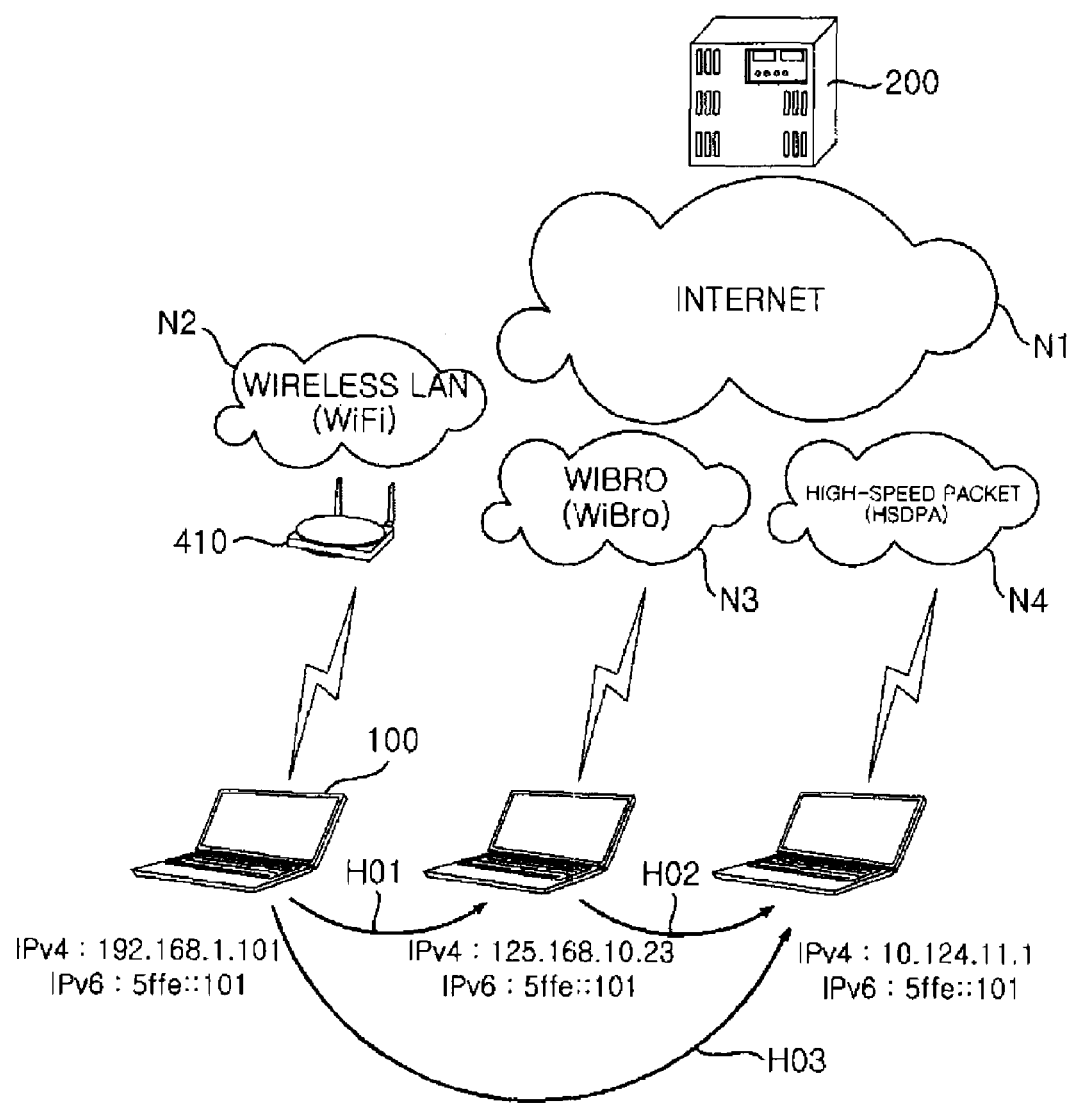
FIG. 1 is a conceptional view for explaining network connecting types of a mobile terminal for handover between different networks.

FIG. 1 is a conceptional view for explaining network connecting types of a mobile terminal for handover between different networks.

Referring to FIG. 1, the mobile terminal 100 detects radio signals from a plurality of networks N2, N3 and N4, selects one of the detected radio signals and connects with the network corresponding to the selected radio signal to be connected to the Internet N1 and transmits/receives predetermined data. Furthermore, the mobile terminal 100 selects one of the detected radio signals to perform handover. Here, IPv6-over-IPv4 tunnel is used between the mobile terminal 100 that uses a service and a control server 200 that provides the service.

For example, the mobile terminal 100 detects radio signals from at least one of wireless LAN (WiFi) N2, Wibro N3 and high-speed packet network (HSDPA) N4 while moving, selects a radio signal that satisfies a predetermined condition from the detected radio signals to connect with the network corresponding to the selected radio signal, and is connected to the Internet N1 through the network to use a predetermined data service or real-time service.

Furthermore, while the mobile terminal 100 is using a network corresponding to an initially selected radio signal, the mobile terminal 100 detects radio signals with respect of networks such as the aforementioned wireless LAN (WiFi) N2, Wibro N3 and high-speed packet network (HSDPA) N4 to perform handover.

For example, the mobile terminal 100 continuously monitors a radio signal from at least one of the Wibro N3 and the high-speed packet network (HSDPA) N4 while detecting a radio signal from an access pointer 410 of the wireless LAN (WiFi) N2, setting the wireless LAN (WiFi) N2 to active and connecting with the wireless LAN (WiFi) N2 to be provided with a predetermined service. Furthermore, the mobile terminal 100 continuously monitors radio signals from the wireless LAN (WiFi) N2 and the high-speed packet network (HSDPA) N4 while setting the Wibro N3 to active to be provided with a predetermined service.

As described above, the mobile terminal 100 detects a radio signal of a network to hand over to the network while being connected to another network. That is, the mobile terminal 100 can perform handover between different networks, that is, between the wireless LAN (WiFi) N2 and the Wibro N3, between the wireless LAN (WiFi) N2 and the high-speed packet network (HSDPA) N4 and between the Wibro N3 and the high-speed packet network (HSDPA) N4.

In the case of handover of the mobile terminal 100 to another network (H01, H02 and H03), the mobile terminal 100 performs handover using a tunnel established between the mobile terminal 100 and the control server 200 such that the service being used by the mobile terminal is continuously provided to the mobile terminal 100 even during the handover.

The control server 200 sets and manages a tunnel for transmitting data such that a predetermined service is provided to the mobile terminal, enables handover of the mobile terminal between different networks and transmits data of the service, which is being provided to the mobile terminal, to the mobile terminal without cease during the handover. Here, the control server 200 provides a predetermined service to the mobile terminal in such a manner that the control server 200 provides contents included therein to the mobile terminal or is connected to a contents providing server such as a portal server to transmit data of the portal server through the established tunnel.

The tunnel established between the mobile terminal 100 and the control server 200 operates based on IPv4 network environment, and thus the tunnel has "network address translation (NAT) Traversal" function and supports IPv6-UDP-IPv4 tunnel. Here, IPv6-over-IPv4 and IPv6-UDP-IPv4 form a tunnel in an IPv4-based network such that IPv6 packets can be transmitted.

The control server 200 sets a tunnel for the mobile terminal 100 connected to IPv4 based network such that IPv6 packets can be transmitted to the mobile terminal 100.

To achieve seamless handover between different networks in the state that tunneling between the mobile terminal 100 and the control server 200 is possible, the mobile terminal 100 and the control server 200 establish an active tunnel and a standby tunnel.

The mobile terminal 100 determines a tunnel switching time according to the quantity of a radio signal detected from an interface for the active tunnel or the standby tunnel and performs a tunnel switching procedure with the control server 200 to achieve the seamless handover. Here, the seamless handover is to perform handover while maintaining quality of service (QoS) before the handover.

The active tunnel is used to transmit/receive general data traffic, that is, substantial data, as well as control messages between the mobile terminal 100 and the control server 200. The standby tunnel is a subsidiary tunnel that does not intervene in substantial receiving/transmission of data and periodically transmits/receives a control message. The standby tunnel is prepared in advance between the control server 200 and the mobile terminal 100 in order to prevent data loss during tunnel switching.

If NAT is detected while the standby tunnel is set, a mapping table of NAT equipment must be updated, and thus the mobile terminal 100 transmits a message that was used to establish a tunnel to the control server 200 periodically (every 30 seconds).

When the mobile terminal 100 is located in a network, the mobile terminal 100 receives a common IP from an Internet service provider (ISP) and may receive a private IP from NAT and use the private IP according to circumstances. NAT connects a common IP allocated by the ISP to an external network, assigns a private IP to each of mobile terminals connected thereto and maps private IP and port information to external IP and port information to allow the mobile terminal to perform communication. The NAT equipment allows a plurality of mobile terminals to be connected to an external network using a single common IP. Accordingly, the mapping table must be updated, as described above, when the mobile terminal 100 is connected to a predetermined network through NAP to connect with the control server 200.

Figure 2:
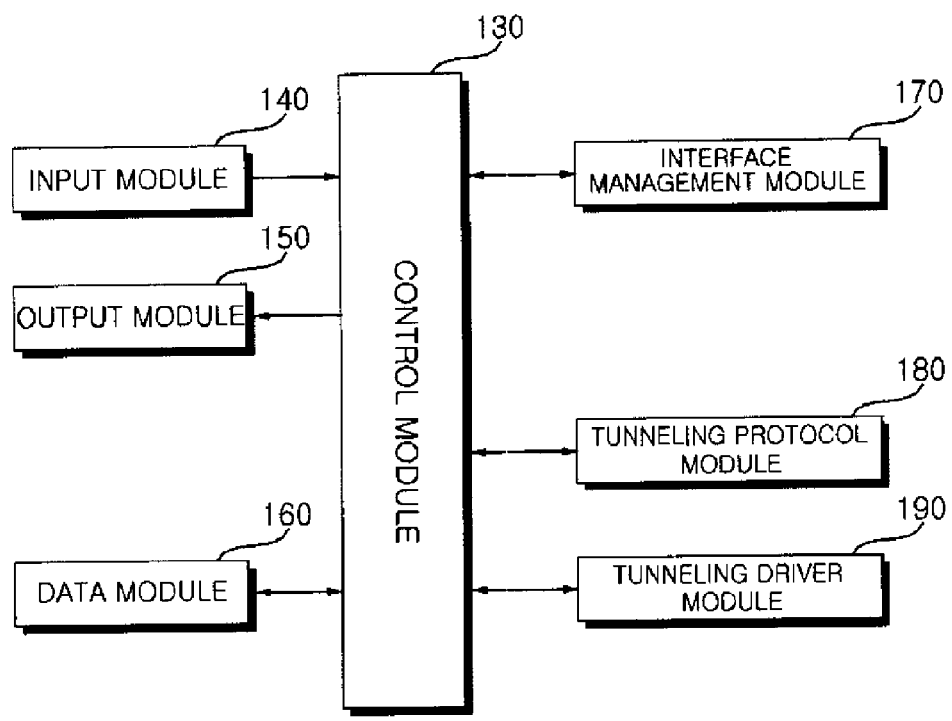
FIG. 2 is a block diagram of the mobile terminal illustrated in FIG. 1.

FIG. 2 is a block diagram of the mobile terminal illustrated in FIG. 1.

The mobile terminal 100 includes an interface management module 170 for monitoring and managing wired/wireless interfaces and signal quality, a tunneling protocol module 180 for processing a tunneling procedure with the control server 200, and a tunneling driver module 190 for establishing or deleting a tunnel and transmitting/receiving tunneling data.

In addition, the mobile terminal 100 includes an input module 140 for receiving predetermined data, an output module 150 for outputting data, a data module 160 for storing data, and a control module 130 for controlling various matters with respect to the operation of the mobile terminal. Furthermore, the mobile terminal 100 includes connection modules (not shown) through which the mobile terminal is connected to a plurality of networks N1, N2, N3 and N4. For example, the mobile terminal 100 includes connection modules respectively connected to a mobile communication network, wireless LAN (WiFi) N2, Wibro B3 and high-speed packet network (HSDPA) N4.

The input module 140 includes at least one input unit and transfers a signal inputted through the input unit to the control module 130. The output module 150 outputs the result of a predetermined operation performed by the control module 130 in response to data inputted through the input module 140. In the case that the mobile terminal 100 is connected to a network to be provided with a predetermined service, the output module 150 outputs data with respect to the service. The output module 150 includes at least one of output units such as a display and a sound output unit. The data module 160 stores transmitted/received data, control data with respect to the operation of the mobile terminal 100 and connection information of the mobile terminal 100 according to network connection.

The mobile terminal 100 includes a base interface and a prepare interface as interfaces for transmitting/receiving control messages to/from the control server 200. The mobile terminal 100 can transmit a control message for setting and controlling a standby tunnel using the base interface and the prepare interface while data is being transmitted and received through a previously established active tunnel.

The interface management module 170 confirms interface information of the mobile terminal, such as IPv4 address, IPv6 address and name, and manages IPv4 address and IPv6 address of the control server 200 for communication with the control server 200. In addition, the interface management module 170 manages an active interface and a standby interface for transmitting data through an active tunnel and a standby tunnel.

The interface management module 170 requests the control server 200 to set the active tunnel or the standby tunnel. The interface management module 170 selects one of the active interface and the standby interface when data is transmitted in order to maintain the established tunnel or when data with respect to service used by the mobile terminal 100 is transmitted. Furthermore, the interface management module 170 provides information to the tunneling protocol module 180 and the tunneling driver module 190 with reference to root information configured in the mobile terminal 100 such that data is transmitted to the control server 200 using the selected interface.

The tunneling protocol module 180 transmits a control message for requesting the control server 200 to set the active tunnel or the standby tunnel through the interface selected by the interface management module 170 according to a control command for tunnel establishment from the control server 130. Here, the control server 200 sets and operates a base interface and a prepare interface and the mobile terminal 100 requests the control server 200 to establish a tunnel through one of the two interfaces.

That is, the mobile terminal 100 selects one of the base interface and the prepare interface prepared by the control server 200 when one of the active interface and the standby interface is selected through the interface management module 170. Then, the control server 200 transmits a tunnel establishment request message through the tunneling protocol module 180 to set a tunnel. If the standby tunnel is set, the mobile terminal 100 selects an interface that is not used to generate the active tunnel from the two interfaces of the control server 200 and transmits the control message through the selected interface. Here, the mobile terminal 100 configures 32-bit full masking root information in a root table thereof and transmits the information.

When a response message of the control server 200 for a tunnel establishment request of the mobile terminal 100 is received, the tunneling driver module 190 finishes tunnel establishment in the mobile terminal 100 and creates a tunnel table in response to the response message of the control server 200.

After the active tunnel and the standby tunnel are established as described above, the mobile terminal 100 transmits/receives a control message for tunnel switching to the standby tunnel to/from the control server 200 for a predetermined network detected as the mobile terminal 100 moves so as to perform handover to the network.

Here, the tunneling driver module 190 requests the control server 200 to delete the previously established active tunnel when the mobile terminal 100 switches the standby tunnel to an active tunnel to perform handover using tunnel switching and deletes the previously established active tunnel.

Figure 3:
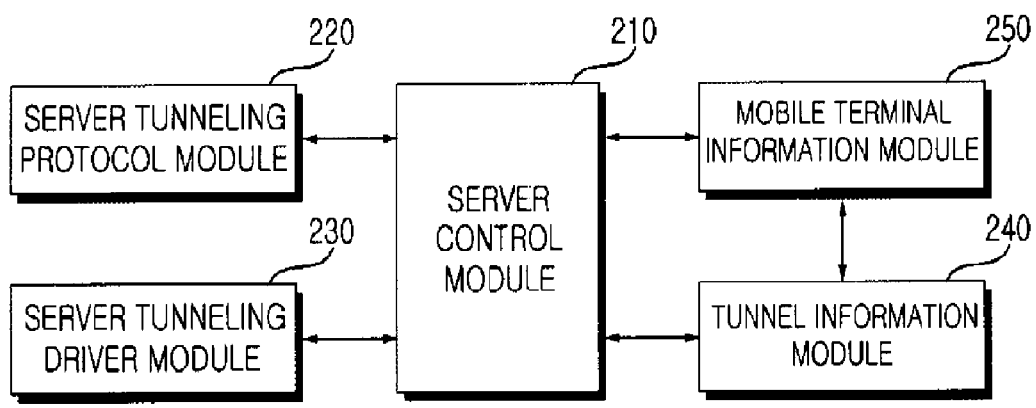
FIG. 3 is a block diagram of a control server illustrated in FIG. 1.

Referring to FIG. 3, the control server 200 includes a server tunneling protocol module 200 for controlling a tunnel according to a tunneling request message received from the mobile terminal 100 and a server tunneling driver module 230 for establishing/deleting a tunnel and forwarding tunneling data. In addition, the control server 200 includes a mobile terminal information module 250 for storing data with respect to service used by the mobile terminal 100 and information on the mobile terminal 100, a tunnel information module 240 for storing information on a tunnel set in the mobile terminal 100, and a server control module 210 for controlling the overall operation of the control server 200.

The control server 200 sets an active tunnel and a standby tunnel between the control server 200 and the mobile terminal 100 and uses the tunnels to provide real-time services to the mobile terminal 100 and allows the mobile terminal 100 to undergo handover to a heterogeneous network. Here, the mobile terminal 100 can be continuously provided with service even during handover through tunnel switching using the active tunnel and the standby tunnel.

A process of performing handover of the mobile terminal 100 from wireless LAN (WiFi) N2 to Wibro N3 will now be explained.

Figure 4:
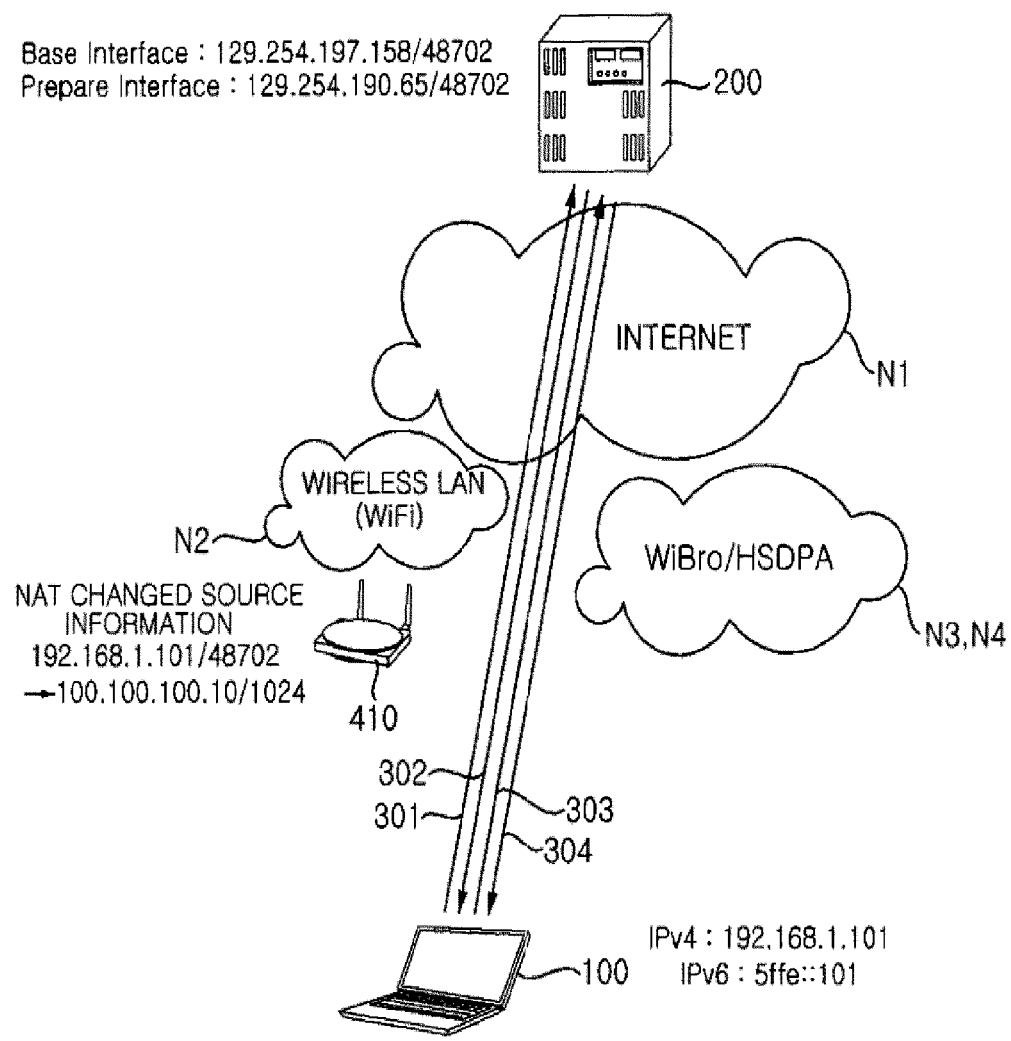
FIG. 4 is a conceptional view for explaining a process in which the mobile terminal is connected to an initial network, selects an active interface and sets an active tunnel.
Figure 5:
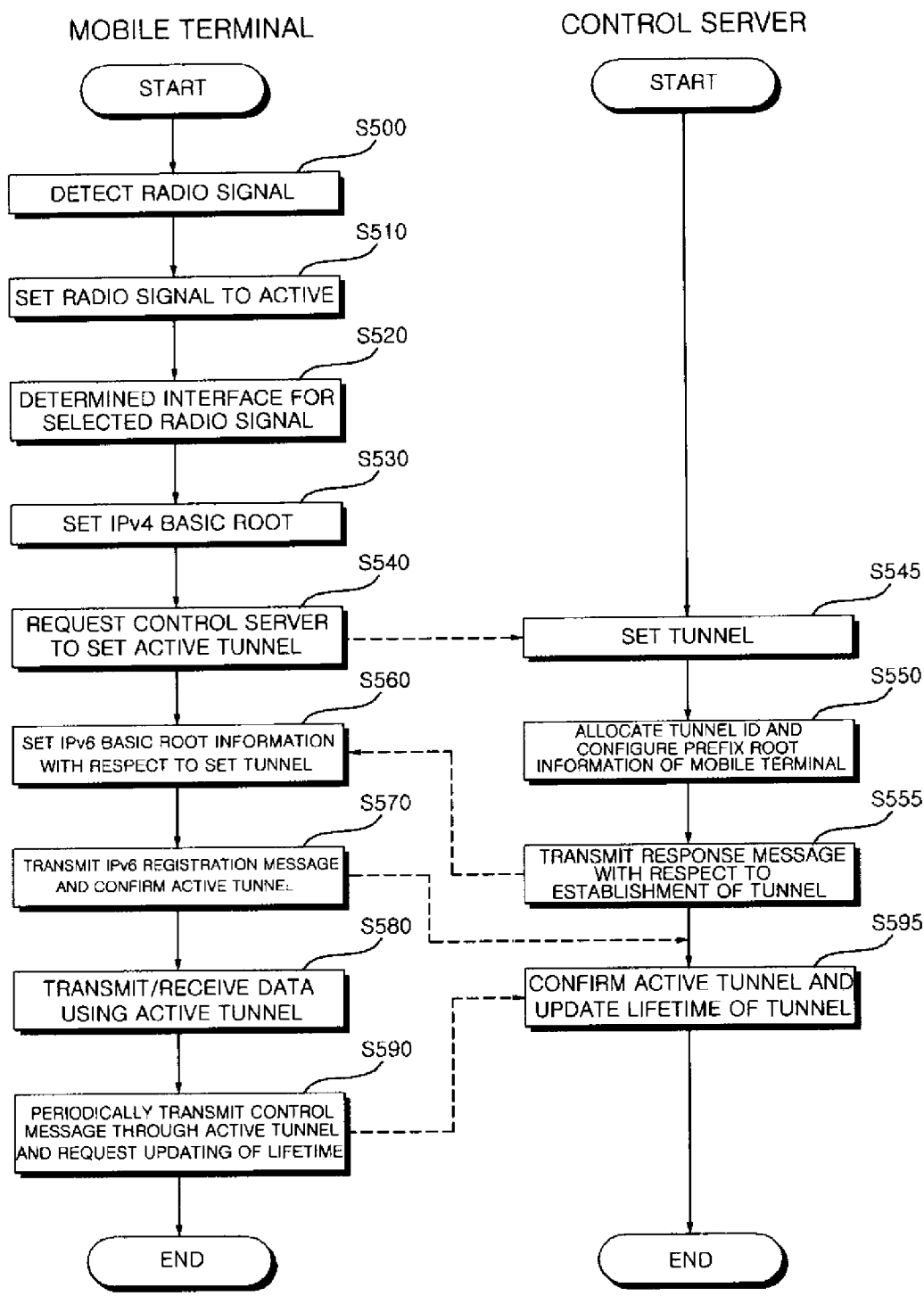
FIG. 5 is a flow chart for explaining the operations of the mobile terminal and the control server according to active tunnel establishment of FIG. 4.

FIG. 4 is a conceptional view for explaining a process in which the mobile terminal is connected to an initial network, selects an active interface and sets an active tunnel, and FIG. 5 is a flow chart for explaining the operations of the mobile terminal and the control server according to active tunnel establishment of FIG. 4.

Referring to FIGS. 4 and 5, the mobile terminal 100 detects at least one radio signal in step S550 and selects a network corresponding to the detected RF signal from at least one network as an active network in step S510 to determine an active interface in step S20. At this time, the interface management module 170 of the mobile terminal 100 selects one of detected radio signals to determine the active interface and sets IPv4 basic root for the determined interface in step S530.

The mobile terminal 100 requests the control server 200 to set an active tunnel through the active interface in operation S540. Here, the tunneling protocol module 180 requests the control server 200 to set the active tunnel. For example, the mobile terminal 100 sets the wireless LAN (WiFi) N2 as an active network and requests the control server 200 to establish the active tunnel for the wireless LAN (WiFi) N2 connected through the access point 410 via the active interface.

The control server 200 receives an active tunnel establishment request message 301 from the mobile terminal 100 and establishes a tunnel for the mobile terminal in operation S545. Here, the server tunneling driver module 230 of the control server 200 sets the tunnel and allocates a tunnel ID. At this time, the control server 200 sets and operates a base interface 129.254.197.158/48702 and a prepare interface 129.254.190.65/48702. The mobile terminal 100 requests the control server 200 to set a tunnel using one of the base interface and the prepare interface as the end point of the tunnel.

Here, the IP of the mobile terminal 100 is 192.168.1.101, UDP port is 48702 and IPv6 is 5ffe::101. The control server 200 sets an active tunnel for the mobile terminal 100 with the base interface 129.254.197.158 and a tunnel ID 110 is allocated to the active tunnel. The tunnel ID is a value for identifying each tunnel when a plurality of tunnels are allocated to the mobile terminal 100.

The control server 200 configures 128-bit prefix root information of the mobile terminal 100 in the corresponding tunnel in step S550. The control server 200 transmits a response message 302 for tunnel allocation to the mobile terminal 100 in step S555.

In establishment of a tunnel between the control server 200 and the mobile terminal 100, when NAT equipment is intervened in the tunnel establishment, the control server 200 changes the source IP address and UDP port number of the mobile terminal and sets destination information of the tunnel to changed information 100.100.100.10/1024 in a tunnel table.

A tunnel table set in the control server 200 and the mobile terminal 100 when the NAT equipment is intervened in tunnel establishment is as follows.

TABLE 1

|  | Destination IPv6 | Role | Tunnel ID | Source | | Destination | |
|---|---|---|---|---|---|---|---|
|  |  |  |  | IP Address | UDP Port | IP Address | UDP Port |
| Control server | 5ffe::101 | Active | 110 | 129.254.197.158 | 48702 | 100.100.100.10 | 1024 |
|  |  | Standby | — | — | — | — | — |
| Mobile terminal | ::/0 | Active | 110 | 192.168.1.101 | 48702 | 129.254.197.158 | 48702 |
|  |  | Standby | — | — | — | — | — |

The mobile terminal 100 receives a response message according to active tunnel establishment from the control server 200, sets an active tunnel through the tunneling driver module 190, as represented by Table 1, and configures IPv6 basic root information in the active tunnel in step S560.

The mobile terminal 100 transmits an IPv6 registration request message to the control server 200 to confirm that the established active tunnel is a valid active tunnel in step S570. The mobile terminal 100 configures the IPv6 basic root information, as described above and registers IPv6 in the control server 200, and thus the mobile terminal 100 can transmit and receive IPv6 data traffic through the active tunnel in step S580. Furthermore, the mobile terminal 100 periodically transmits a message 303 to update lifetime of tunnel information of the control server 200 in step S590.

The control server 200 periodically receives the IPv6 registration request message from the mobile terminal 100 and updates the lifetime of the tunnel information through the server tunneling protocol module 220 (304) in step S595.

Figure 6:
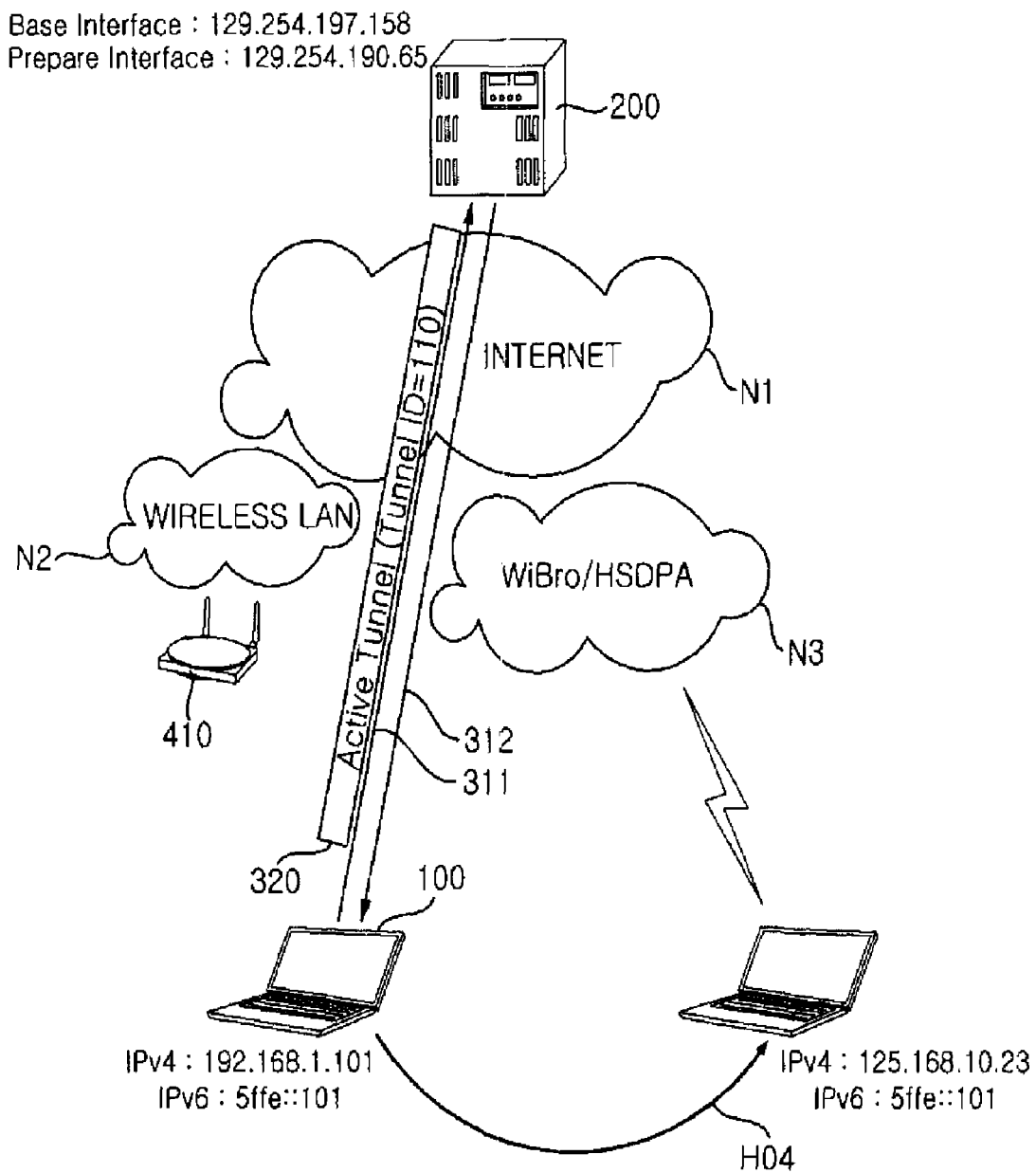
FIG. 6 is a conceptional view for explaining a process of detecting a signal of another network and setting a standby tunnel after an active tunnel is established for the mobile terminal.
Figure 7:
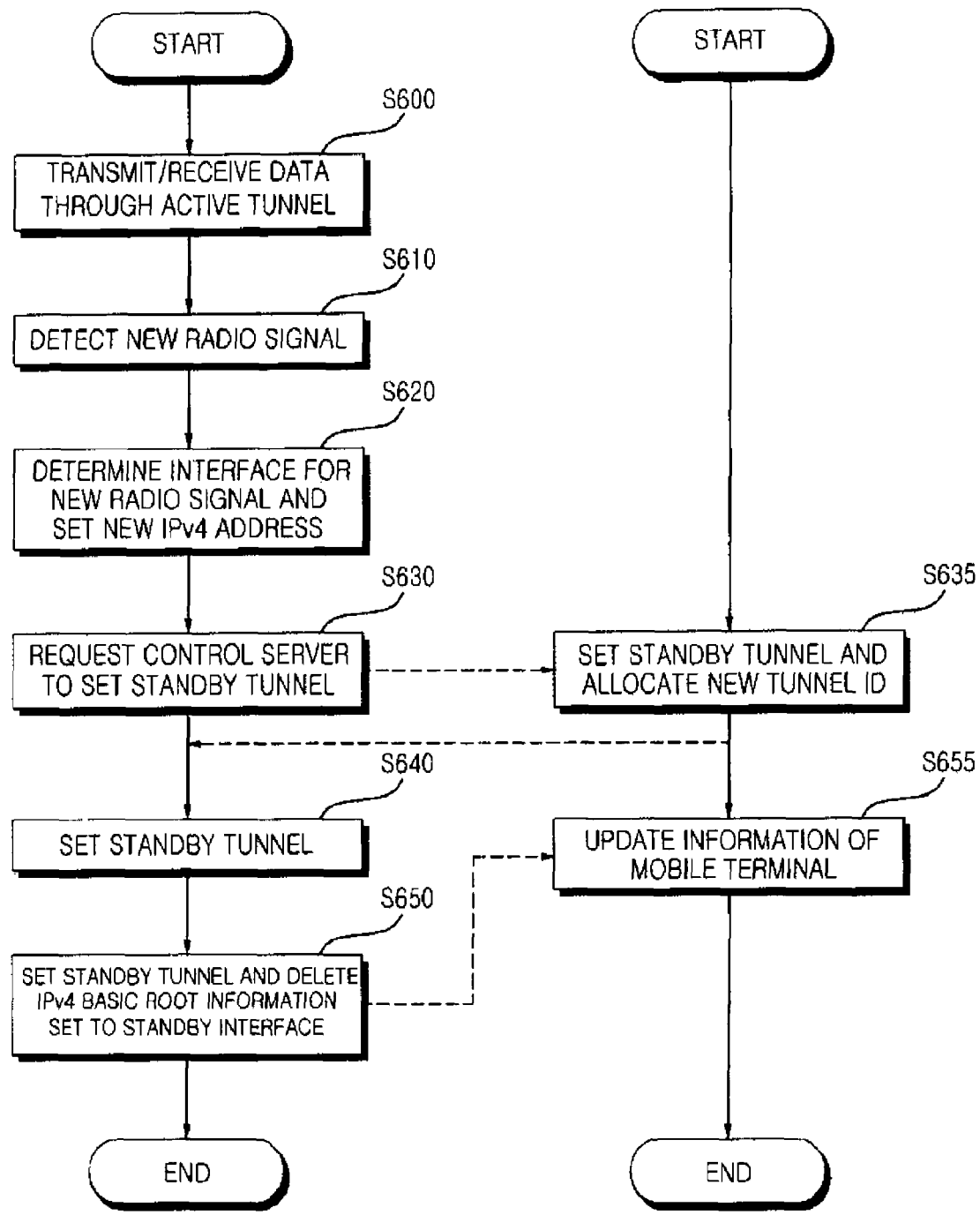
FIG. 7 is a flow chart for explaining the operations of the mobile terminal and the control server according to standby tunnel establishment of FIG. 6.

FIG. 6 is a conceptional view for explaining a process of detecting a signal of another network and setting a standby tunnel after the active tunnel to the mobile terminal is established and FIG. 7 is a flow chart for explaining the operations of the mobile terminal and the control server according to standby tunnel establishment of FIG. 6.

Referring to FIGS. 6 and 7, after the mobile terminal 100 completes establishment of the active tunnel, the interface management module 170 of the mobile terminal 100 selects a new radio signal, determines a standby interface and requests the control server 200 to set a standby tunnel through the tunneling protocol module 190 to establish the standby tunnel.

The mobile terminal 100 transmits/receives a control message for setting the standby tunnel using an IPv4 address different from the IPv4 address used when the active tunnel is set. Furthermore, the mobile terminal 100 uses a standby tunnel destination IP address different from the IPv4 address used to set the active tunnel. This is because the mobile terminal 100 should transmit the control message to the base interface or the prepare interface of the control server 200 in order to set the standby tunnel with a desired interface and repeat an operation of configuring 32-bit IPv4 root information in the root table, transmitting the control message and deleting the IPv4 root information from the root table when receiving a response from the control server 200 whenever the control message is transmitted.

If the mobile terminal 100 uses the same IPv4 address when a control message is transmitted through the previously established active tunnel and when the standby tunnel is generated, even general data traffic temporarily uses the standby tunnel while the control message is transmitted and received through the standby interface. The standby tunnel is not used to transmit general data and it is used to transmit a control message in order to maintain the established standby tunnel after the standby tunnel is set. Accordingly, the control server 200 maintains the base interface and the prepare interface such that general data is not transmitted through the standby tunnel.

That is, the mobile terminal 100 transmits the control message in order to set the standby tunnel using the destination IPv4 address of the standby tunnel, which is different from the destination IPv4 address of the control message used for the previously established active tunnel, such that general data traffic uses the previously set active tunnel without using the standby tunnel when the mobile terminal 100 configures the 32-bit IPv4 root information in the root table and transmits the control message to the standby interface.

The mobile terminal 100 transmits/receives data through the previously established active tunnel 320 in step S600 and continuously detects radio signals with respect to networks other than the network to which the mobile terminal 100 is currently connected in step S610.

The interface management module 170 of the mobile terminal 100 selects one of the detected radio signals and determines an interface for the network corresponding to the selected radio signal. For example, the interface management module 170 can select Wibro N3 and set a standby interface while an active tunnel is established according to connection of the mobile terminal 100 with wireless LAN (WiFi) N2.

Here, the tunneling protocol module 180 of the mobile terminal 100 sets a new IPv4 address in order to transmit a control message through the standby interface in step S620. The mobile terminal 100 sets the address of the prepare interface 129.254.190.65, which is not used to establish the active tunnel, among IPv4 addresses of the control server 200 as the end point of the tunnel and configures the 32-bit IPv4 root information in the root table in step S620.

The mobile terminal 100 requests the control server 200 to set the standby tunnel through the standby interface (311) in step S630.

The control server 200 sets the standby tunnel in response to the standby tunnel establishment request of the mobile terminal 100 and allocates a new tunnel ID to the newly generated standby tunnel in step S635. Furthermore, the control server 200 transmits a response message 312 with respect to completion of establishment of the standby tunnel to the mobile terminal 100. Here, the server tunneling driver module 230 of the control server 200 generates the standby tunnel.

In the case where the control server 200 establishes the standby tunnel via NAT, the control server 200 changes the source IP and UDP port number of the mobile terminal and sets the changed information 200.200.200.20/2024 as tunnel destination information to perform NAT traversal function as the control server 200 does for establishing the active tunnel.

The mobile terminal 100 receives the response message from the control server 200, sets the tunnel and transmits a periodic message to the control server 200 when establishing the tunnel via NAT to update an NAP mapping table of the standby tunnel in step S640.

The mobile terminal 100 receives the response message with respect to the standby tunnel, and then deletes the 32-bit IPv4 root information set to the standby interface from the root table in step S650.

A tunnel table of the mobile terminal 100 and the control server 200 according to establishment of the active tunnel and the standby tunnel is as follows.

TABLE 2

| | Destination IPv6 | Role | Tunnel ID | Source | | Destination | |
|---|---|---|---|---|---|---|---|
| | | | | IP Address | UDP Port | IP Address | UDP Port |
| Control server | 5ffe::101 | Active | 110 | 129.254.197.158 | 48702 | 100.100.100.10 | 1024 |
| | | Standby | 120 | 129.254.190.65 | 48702 | 200.200.200.20 | 2024 |
| Mobile terminal | ::/0 | Active | 110 | 192.168.1.101 | 48702 | 129.254.197.158 | 48702 |
| | | Standby | 120 | 125.168.10.23 | 48702 | 129.254.190.65 | 48702 |

Accordingly, the mobile terminal completes preparation for moving from the network to which the mobile terminal is currently connected to another network. Here, the mobile terminal 100 uses the destination IPv4 address different from the destination IPv4 address used for the previously established active tunnel, and thus general IPv6 data traffic transmitted through the active tunnel is not affected.

Figure 8:
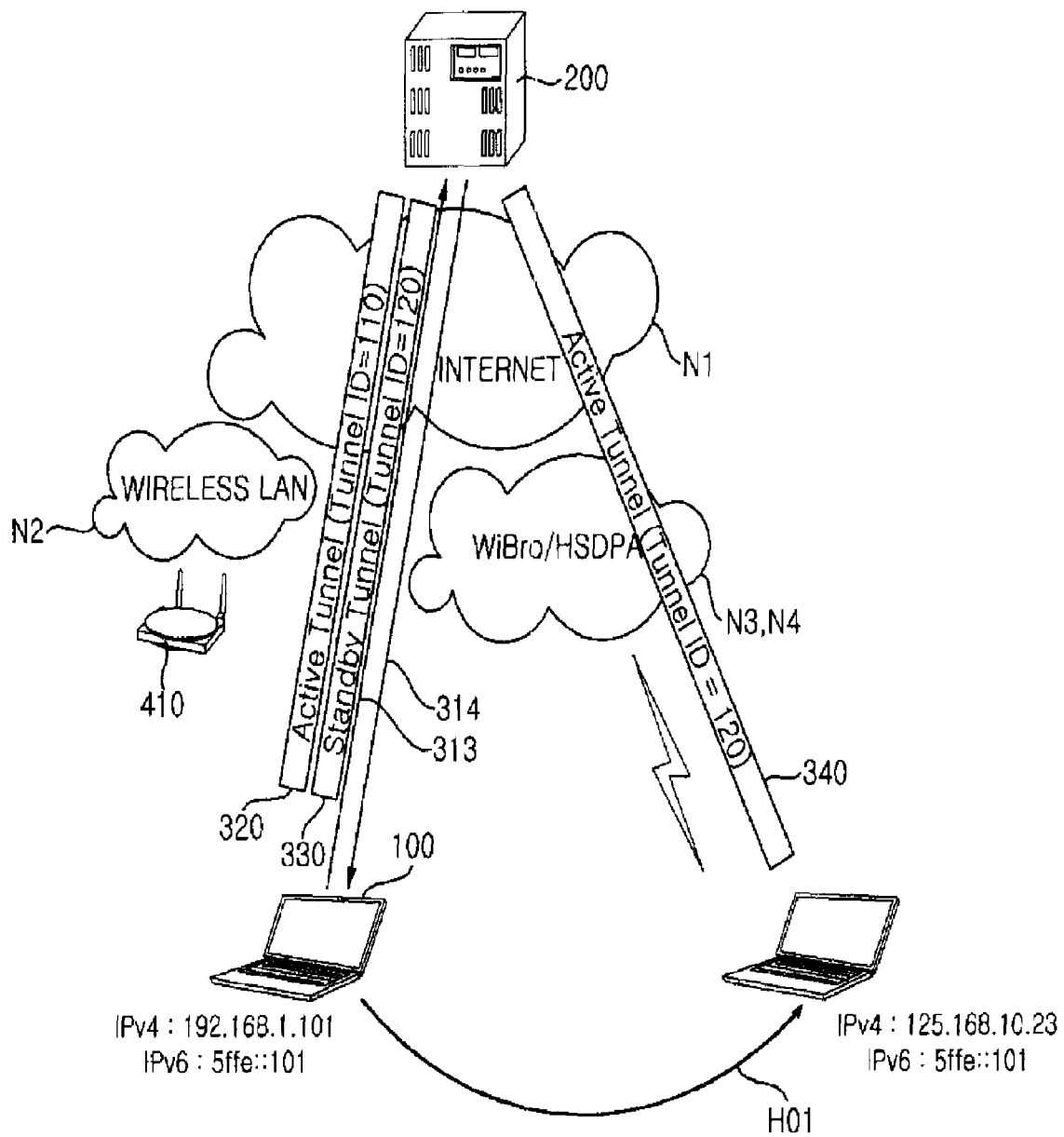
FIG. 8 is a conceptional view for explaining a process of performing handover of the mobile terminal to another network using an active tunnel and a standby tunnel.
Figure 9:
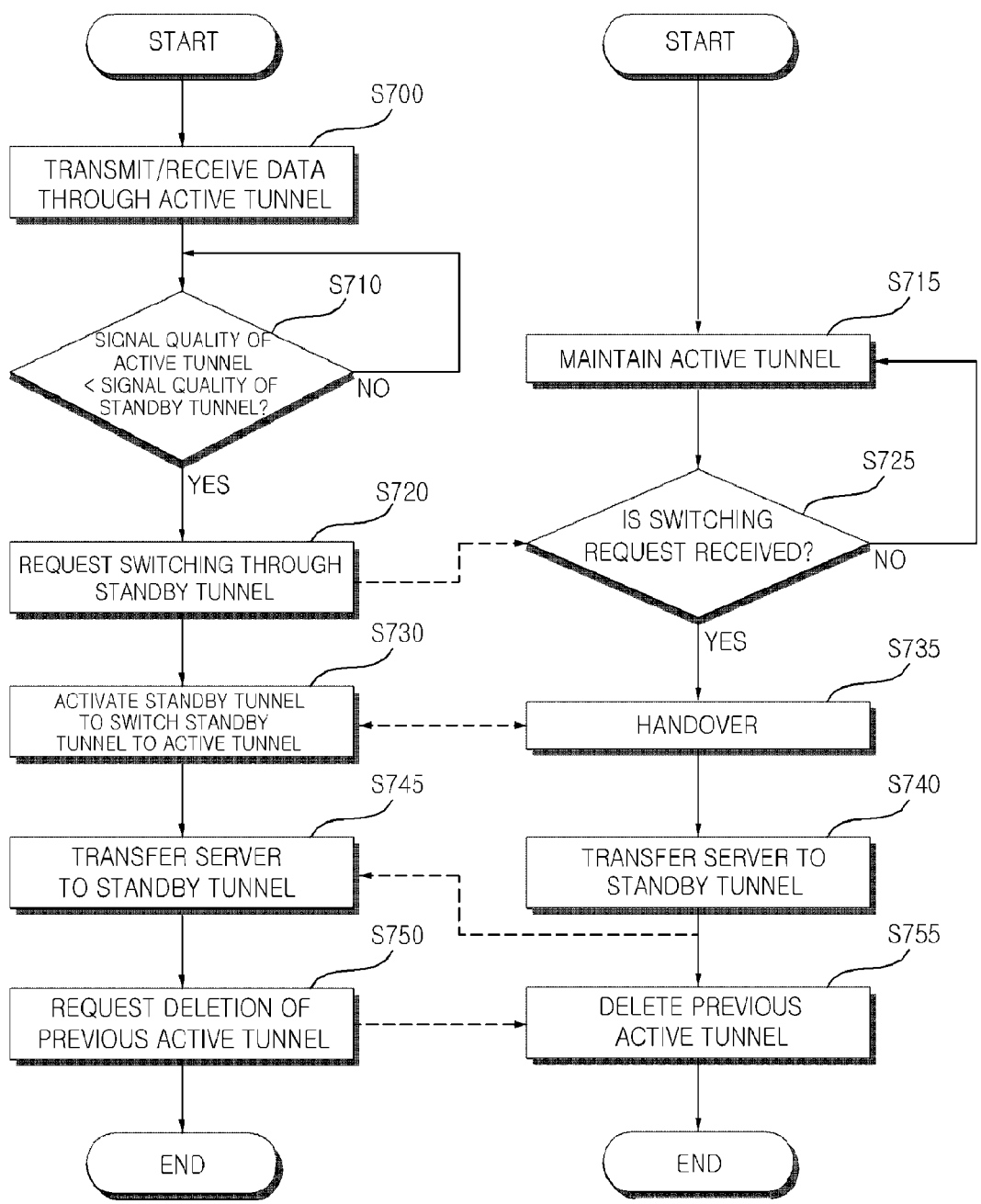
FIG. 9 is a flow chart for explaining the operation of the mobile terminal according to handover of the mobile terminal of FIG. 8.

FIG. 8 is a conceptional view for explaining a process in which the mobile terminal hands over to another network using the active tunnel and the standby tunnel and FIG. 9 is a flow chart for explaining the operation of the mobile terminal according to the handover of the mobile terminal of FIG. 8.

Referring to FIG. 8, when the active tunnel and the standby tunnel are established, as illustrated in FIGS. 6 and 7, the interface management module 170 of the mobile terminal 100 compares radio signals of the active interface and the standby interface to each other and performs seamless handover through tunnel switching for a stabilized interface having high signal quality.

For example, the mobile terminal 100 compares a radio signal of wireless LAN (WiFi) N2 of the active interface, transmitted through the active tunnel, with a radio signal of Wibro N3 of the standby interface, transmitted through the standby tunnel. When the radio signal of the standby interface has signal quality higher than that of the radio signal of the active interface and is stabler than the radio signal of the active interface, the mobile terminal switches the standby tunnel to an active tunnel through a tunnel switching process and performs handover to Wibro N3 (H01).

Referring to FIG. 9, the mobile terminal 100 transmits/receives data through the previously established active tunnel 320 in step S700 and maintains the standby tunnel (330).

Here, the interface management module 170 of the mobile terminal 100 compares the radio signal of the active interface with the radio signal of the standby interface in step S710 and determines a tunnel switching time for switching the standby tunnel 330 to an active tunnel. The tunneling protocol module 180 requests the control server 200 to perform tunnel switching through the standby tunnel 330 in step S720. The interface management module 170 switches the standby tunnel when it is determined that the signal quality of the standby tunnel is high and stabilized. At this time, the mobile terminal 200 requests switching of the standby tunnel using the existing IPv6 tunnel registration request message (with tunnel ID 120).

The control server 200 updates and maintains the lifetime of the previously established active tunnel 320 through an active tunnel confirmation message received from the mobile terminal 100 before the tunnel switching request of the mobile terminal 100 is received in step S715. When the control server 200 receives the tunnel switching request from the mobile terminal 100 through the standby tunnel 330 in step S725, the control server 200 switches the standby tunnel to an active tunnel to hand over the mobile in step S735. That is, the control server 200 switches the existing standby tunnel 330 to a new active tunnel 340 (with tunnel ID 120) to perform tunnel switching and transmits a response message with respect to the tunnel switching to the mobile terminal 100.

The mobile terminal 100 sets the standby tunnel 330 to active according to the response message of the control server 200 to switch the standby tunnel 330 to the new active tunnel 340 (with tunnel ID 120) in step S730.

When the standby tunnel 330 is switched to the active tunnel 340, the control server 200 transfers the service provided to the mobile terminal 100 through the previously established active tunnel 320 such that the service is provided to the mobile terminal 100 through the new active tunnel 340 in step S740. The mobile terminal 100 receives the service, which has been provided through the previous active tunnel 320, through the new active tunnel 340 (with tunnel ID 120) in step S745.

Upon the completion of service transfer, the interface management module 170 of the mobile terminal 100 requests the control server 200 to delete the previous active tunnel 320 and the control server 200 deletes the previous active tunnel 320 in response to the request of the mobile terminal 100. At this time, the mobile terminal 100 maintains information of the previous active tunnel 320 until the deletion of the previous active tunnel 320 is completed. That is, the mobile terminal 100 maintains the tunnel information of the two active tunnels until service transfer is completed and the control server 200 deletes the previous active tunnel 320 to prevent data loss that may occur during packet roundtrip time (RTT) in a control message transmitting/receiving period.

A tunnel table of the mobile terminal 100 and the control server 200 according to switching of the standby tunnel to the active tunnel and handover of the mobile terminal is as follows.

TABLE 3

|  | Destination IPv6 | Role | Tunnel ID | Source IP Address | Source UDP Port | Destination IP Address | Destination UDP Port |
|---|---|---|---|---|---|---|---|
| Control server | 5ffe::101 | Active | 120 | 129.254.190.65 | 48702 | 200.200.200.20 | 2024 |
|  |  | Standby | — | — | — | — | — |
| Mobile terminal | ::/0 | Active | 120 | 125.168.10.23 | 48702 | 129.254.190.65 | 48702 |
|  |  | Standby | — | — | — | — | — |

As represented by Table 3, the previous standby tunnel 330 (having tunnel ID 120) of the mobile terminal 100 is switched to an active state and set as the new active tunnel 340 (having tunnel ID 120) and the previous active tunnel 320 is deleted. Accordingly, the mobile terminal 100 can transmit and receive data through the new active tunnel 340 to continuously receive the service.

Subsequently, the mobile terminal 100 detects a new radio signal, sets a new standby tunnel and performs seamless handover according to the quality of the detected radio signal, as illustrated in FIGS. 6 and 7. After the active/standby tunnel is established as described above, a control message for switching to a standby tunnel is transmitted and received when it is required for the mobile terminal to hand over to a different network. The aforementioned method does not generate data loss when tunnel switching is performed.

As described above, the present invention establishes an active tunnel and a standby tunnel between the mobile terminal 100 and the control server 200 and switches the tunnels in response to the quality of radio signals of the tunnels while both the active tunnel and the standby tunnel set for the mobile terminal are available. Accordingly, data loss does not occur even when the mobile terminal hands over between different networks, and thus service continuity in real-time data communication service can be secured.

While the apparatus and method for seamless handover between hetero-networks based on IPv6-over-IPv4 tunneling mechanism according to the present invention have been described with reference to the attached drawings, it will be understood by those skilled in the art that various changes in form and details may be made therein without departing from the spirit and scope of the invention as defined by the appended claims.

INDUSTRIAL APPLICABILITY

The present invention is applied to handover between different networks based on IPv6 over IPv4 tunneling and can switch tunnels in response to the quality of radio signals of the tunnels in the state that both an active tunnel and a standby tunnel established for a mobile terminal are available when the mobile terminal hands over between different networks to secure service continuity in real-time data communication service.

The invention claimed is:

1. An operating method of a mobile terminal for handover, comprising:

detecting a radio signal, connecting with a first network and requesting a control server to set a first tunnel for transmitting data packets;

detecting a radio signal of a second network different from the first network and requesting the control server to set a second tunnel corresponding to a standby tunnel by transmitting a control message using an interface, while maintaining the first tunnel established in response to the request as an active tunnel; and requesting the control server to switch the second tunnel to an active tunnel when a radio signal of the second tunnel is stabler than a radio signal of the first tunnel to perform handover to the second network, wherein the first tunnel and the second tunnel are IPv6/IPv4-over-IPv4 tunnel or IPv6/IPv4-UDP-IPv4 tunnel, wherein the control server receives the requests to set the first tunnel and the second tunnel, and the request to switch the second tunnel to the active tunnel, and transmits a response message with respect to the switching to the mobile terminal, and wherein the mobile terminal switches the standby tunnel to the active tunnel upon receiving the response message.

2. The operating method of claim 1, wherein the requesting the control server to set the first tunnel selects one of a base interface and a prepare interface prepared in the control server, which have different IPv4 addresses, and configures root information in a root table to request the control server to set the first tunnel.

3. The operating method of claim 2, wherein the requesting the control server to set the second tunnel requests the control server to establish the second tunnel using one of the base interface and the prepare interface, which is not used for the first tunnel.

4. The operating method of claim 3, wherein the requesting the control server to set the second tunnel requests the control server to establish the second tunnel using an IPv4 address different from that of the first tunnel and further comprises transmitting/receiving a control message with respect to tunnel maintenance.

5. The operating method of claim 1, further comprising requesting the control server to delete the first tunnel after the step of performing handover to the second network, and tunnel information of the first tunnel is maintained before the first tunnel is deleted.

6. The operating method of claim 1, further comprising transmitting an IPv6 registration request to the control server, and configuring an IPv6 basic root information of the active tunnel.

7. A handover control method, comprising:

establishing a first tunnel corresponding to an active tunnel for a first network for a mobile terminal when a first tunnel establishment request is received from the mobile terminal;

establishing a second tunnel corresponding to a standby tunnel for a second network for the mobile terminal when a second tunnel establishment request is received from the mobile terminal; and switching the second tunnel to an active tunnel and switching the first tunnel to a standby tunnel to hand over the mobile terminal to the second network when a request for switching the second tunnel to an active tunnel is received from the mobile terminal wherein the first tunnel and the second tunnel are IPv6/IPv4-over-IPv4 tunnel or IPv6/IPv4-UDP-IPv4 tunnel, wherein a control server receives the first tunnel establishment request, the second tunnel establishment request, and the request for switching the second tunnel to the active tunnel, and transmits a response message with respect to the switching to the mobile terminal, and wherein the mobile terminal switches the standby tunnel to the active tunnel upon receiving the response message.

8. The handover method of claim 7, wherein the establishing the first tunnel and the second tunnel further comprise configuring tunnel information according to a network address translation (NAT) traversal function when NAT equipment is detected while the tunnels are established and transmitting the tunnel information to the mobile terminal.

9. The handover method of claim 8, further comprising updating a mapping table of the NAT equipment when the same IP header information and UDP header information as those used to transmit a control message through the second tunnel is received from the mobile terminal.

10. The handover method of claim 7, further comprising controlling data packets that have been provided through the first tunnel to be transmitted through the second tunnel when the second tunnel is switched to the active tunnel after the step of handing over the mobile terminal.

11. A mobile terminal, comprising:

an interface management module for selecting one of plural radio signals corresponding to a plurality of networks, setting an active interface or a standby interface, managing interfaces, and monitoring and managing signal quality;

a tunneling protocol module for requesting a control server to set an active tunnel or a standby tunnel using the interface selected by the interface management module, such that when the standby tunnel is set, the selected interface is the interface that is not used to set the active tunnel; and a tunneling driver module for establishing a tunnel according to a response of the control server and generating and managing a tunnel management table, wherein the active tunnel and the standby tunnel are IPv6/IPv4-over-IPv4 tunnel or IPv6/IPv4-UDP-IPv4 tunnel, wherein the control server receives the request for setting the active tunnel or the standby tunnel, and transmits a response message with respect to the switching to the mobile terminal, and wherein the mobile terminal switches the standby tunnel to the active tunnel upon receiving the response message.

12. The mobile terminal of claim 11, wherein the interface management module detects a radio signal with respect to a first network among the plurality of networks, sets the active interface, detects a radio signal with respect to a second network and sets the standby interface, and the tunneling protocol module requests the control server to establish a first tunnel corresponding to an active tunnel for the first network using the active interface and requests the control server to establish a second tunnel for the second network using the standby interface while the first tunnel is being maintained.

13. The mobile terminal of claim 12, wherein the interface management module compares the signal quality of the first tunnel with the signal quality of the second tunnel and determines a tunneling time such that the mobile terminal hands over to the second network when the signal quality of the second tunnel is stabler than the signal quality of the first tunnel.

14. The mobile terminal of claim 13, wherein the tunneling protocol module requests the control server to switch the second tunnel to an active tunnel to perform the handover when the tunneling time is determined by the interface management module.

15. The mobile terminal of claim 12, wherein the tunneling protocol module requests the control server to establish the second tunnel using an interface that is set to an IPv4 address different from that of the first tunnel and is not used for the first tunnel.

16. A control server, comprising:
a tunneling driver module for establishing a first tunnel corresponding to an active tunnel and a second tunnel corresponding to a standby tunnel for a mobile terminal at the request of the mobile terminal and allocating tunnel IDs to the first tunnel and the second tunnel, using a selected one of an active interface or a standby interface; and
a server tunneling protocol module for controlling transmission of data packets through the first and second tunnels, transmitting/receiving control messages to/from the mobile terminal and switching the second tunnel to an active tunnel at the request of the mobile terminal such that a service that has been provided through the first tunnel is provided through the second tunnel,
wherein when the second tunnel is established, the selected interface is the interface that is not used to establish the first tunnel,
wherein the first tunnel and the second tunnel are IPv6/IPv4-overIPv4 tunnel or IPv6/IPv4-UDP-IPv4 tunnel,
wherein the control server receives the requests to set the first tunnel and the second tunnel, and the request to switch the second tunnel to the active tunnel, and transmits a response message with respect to the switching to the mobile terminal, and
wherein the mobile terminal switches the standby tunnel to the active tunnel upon receiving the response message.

17. The control server of claim 16, wherein the server tunneling driver module configures tunnel information according to a network address translation (NAT) traversal function when NAT equipment is detected while a tunnel is configured, transmits the tunnel information to the mobile terminal and updates a mapping table of the NAT equipment when the same IP header information and UDP header information as those used to transmit a control message through the second tunnel is received from the mobile terminal.

* * * * *